(12) United States Patent
Zhu Jin et al.

(10) Patent No.: US 10,306,394 B1
(45) Date of Patent: May 28, 2019

(54) METHOD OF MANAGING A PLURALITY OF DEVICES

(71) Applicants: Chang Long Zhu Jin, Mountain View, CA (US); Arun Rakesh Yoganandan, Mountain View, CA (US); Kumi Akivoshi, Mountain View, CA (US)

(72) Inventors: Chang Long Zhu Jin, Mountain View, CA (US); Arun Rakesh Yoganandan, Mountain View, CA (US); Kumi Akivoshi, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/858,667

(22) Filed: Dec. 29, 2017

(51) Int. Cl.
  *H04S 7/00* (2006.01)
  *H04R 5/02* (2006.01)
  *H04S 3/00* (2006.01)
  *G06T 7/73* (2017.01)
  *G06F 3/01* (2006.01)

(52) U.S. Cl.
  CPC ............. *H04S 7/303* (2013.01); *G06F 3/017* (2013.01); *G06T 7/74* (2017.01); *H04R 5/02* (2013.01); *H04S 3/008* (2013.01); *H04S 7/301* (2013.01); *H04S 2400/01* (2013.01); *H04S 2400/15* (2013.01)

(58) Field of Classification Search
  CPC .......... H04S 7/303; H04S 3/008; H04S 7/301; H04S 2400/01; H04S 2400/15; G06T 7/74; G06F 3/017; H04R 5/02
  See application file for complete search history.

(56) References Cited

U.S. PATENT DOCUMENTS

| | | | |
|---|---|---|---|
| 8,976,986 B2 | 3/2015 | Angeloff et al. | |
| 9,210,510 B2 | 12/2015 | Kang et al. | |
| 9,465,450 B2 * | 10/2016 | Cortenraad | G06F 3/0346 |
| 9,522,330 B2 * | 12/2016 | Pile | H04S 7/303 |
| 2007/0116306 A1 | 5/2007 | Riedel | |
| 2012/0268563 A1 | 10/2012 | Chou | |
| 2014/0213226 A1 * | 7/2014 | Filev | H04W 4/023 |
| | | | 455/414.1 |
| 2014/0219483 A1 | 8/2014 | Hong | |
| 2015/0054943 A1 | 2/2015 | Zad Issa et al. | |
| 2015/0381383 A1 * | 12/2015 | Branscomb | H04L 12/282 |
| | | | 455/41.3 |
| 2016/0165337 A1 | 6/2016 | Trestain | |
| 2017/0094437 A1 * | 3/2017 | Kadri | H04R 5/02 |
| 2017/0201847 A1 | 6/2017 | Fujita | |

(Continued)

FOREIGN PATENT DOCUMENTS

| | | |
|---|---|---|
| JP | 2003324800 | 11/2003 |
| KR | 20110097388 | 8/2011 |
| KR | 20160098649 | 8/2016 |

*Primary Examiner* — Mohammad K Islam

(57) ABSTRACT

A method of managing a plurality of devices is described. The method comprises receiving an image comprising the plurality of devices; determining, based on an analysis of the image, a spatial map for the plurality of devices, wherein the spatial map comprises, for each device of the plurality of devices, a position relative to another device of the plurality of devices; and adjusting a sensor of at least one of the plurality of devices to modify an acoustic field associated with the plurality of devices based on the spatial map. A system for providing information is also described.

20 Claims, 11 Drawing Sheets

(56) References Cited

U.S. PATENT DOCUMENTS

2018/0091898 A1* 3/2018 Yoon .................. G01S 5/30
2018/0124543 A1* 5/2018 Leppanen ............ H04S 3/008
2018/0176688 A1* 6/2018 Baek ................ H04N 21/4122

* cited by examiner

METHOD OF MANAGING A PLURALITY OF DEVICES

FIELD OF THE INVENTION

Embodiments of the present invention relate generally to devices such as electronic devices, and in particular, to a method of managing a plurality of devices.

BACKGROUND OF THE INVENTION

As the availability of digital devices rises, the presence of such connected devices, and the multiplicity of digital devices having overlapping capabilities in the household increases. For example, people might have different devices such as tablets, phones, TVs, sound systems, and might have repetition of components and functionalities between them. However, there is a disconnect between the devices and the potential use of the individual capabilities of the devices.

More particularly, many of the digital devices may have the same type of component or combination of components related to sound, such as speakers and/or microphones, with which they perform tasks such as audio playing and voice detection, or more advanced components that detect gestures. Even though different devices possess the same type of components and use the same technology, the operation associated with such components is often confined to their respective devices. When put together as a cluster, they continue to operate as individual units that are oblivious to their neighbors.

Existing solutions for performing calibration among a cluster of freeform devices are cumbersome, often needing specialized hardware or software. Calibration may require multiple steps, take a lot of time, and may place the burden of performing correct calibration steps on the user. As a result, these solutions are not very consumer friendly and hence may have restricted the use of calibration steps for many users of devices.

Accordingly, there is a need for systems and methods that manage a plurality of devices that operate together.

SUMMARY OF THE INVENTION

A method of managing a plurality of devices is described. The method comprises receiving an image comprising the plurality of devices; determining, based on an analysis of the image, a spatial map for the plurality of devices, wherein the spatial map comprises, for each device of the plurality of devices, a position relative to another device of the plurality of devices; and adjusting a sensor of at least one of the plurality of devices to modify an acoustic field associated with the plurality of devices based on the spatial map.

A system for providing information is also described. The system comprises a plurality of devices having sensors; and an electronic device, wherein the electronic device: receives an image comprising the plurality of devices; determines, based on an analysis of the image, a spatial map for the plurality of devices, wherein the spatial map comprises, for each device of the plurality of devices, a position relative to another device of the plurality of devices; and adjusts a sensor of at least one of the plurality of devices to modify an acoustic field associated with the plurality of devices based on the spatial map.

A non-transitory computer-readable storage medium having data stored therein representing instructions executable by a processor to perform a method comprising receiving an image comprising the plurality of devices; determining, based on an analysis of the image, a spatial map for the plurality of devices, wherein the spatial map comprises, for each device of the plurality of devices, a position relative to another device of the plurality of devices; and adjusting a sensor of at least one of the plurality of devices to modify an acoustic field associated with the plurality of devices based on the spatial map.

DETAILED DESCRIPTION OF THE DRAWINGS

Figure 1:
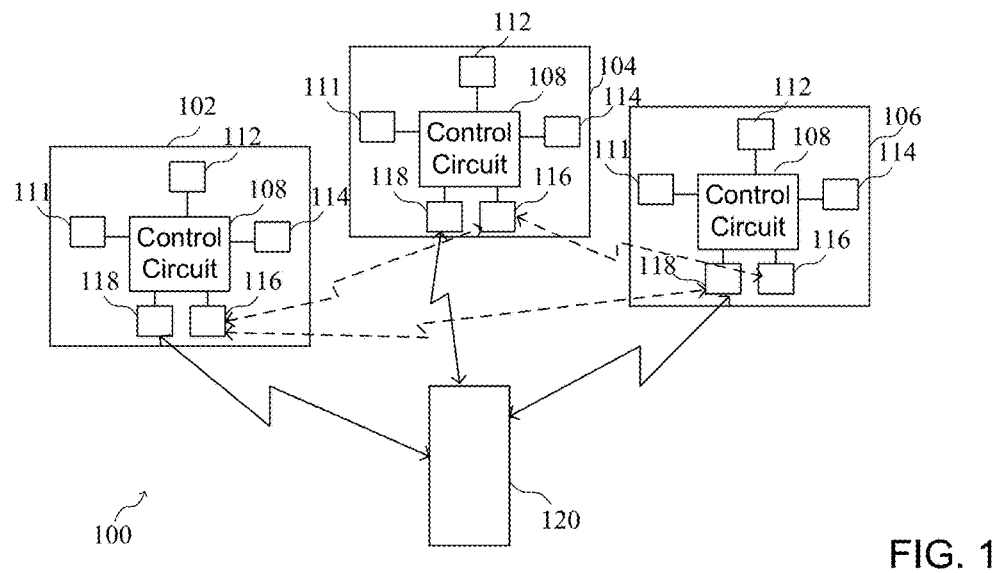
FIG. 1 is an exemplary block diagram of a system having a plurality of devices and a control device.

The following methods and systems allow for a control device to manage a plurality of electronic devices, and can accelerate and improve the calibration process using visual cues and spatial relationship among the devices as additional data to be used for calibration. Because in some scenarios it may be beneficial for a cluster of devices to work together and behave as a group rather than as individual players, determining the capabilities of and the relationships between the devices can be beneficial. For example, it may be beneficial for a cluster of 4 smart speakers in the same room to behave as a group, cooperating with each other to provide a unified surround sound experience rather than as 4 individual speakers. Alternatively, when gesture enabled displays are clustered together, it may be beneficial to perform gestural interaction with the cluster as a whole rather than the individual displays. Unfortunately, when such a cluster is formed, the acoustic fields (for sensing and generating outputs) associated with such devices result in regions with varying levels of overlap and strength, leading to a non-uniform and suboptimal listening experience. Calibration is a beneficial step in such situations to normalize the acoustic field around this cluster and achieve a unified group behavior. However, calibration without the information of the spatial relationship between the plurality of devices from the cluster results in a complicated process, either the user needs to specify each one of the devices location, or each device needs to communicate with others, but often times there is a disconnect between them. Therefore, an automated calibration process that includes automatic detection of the relationships and information of each device is needed. Once calibrated correctly, appropriate distribution of responsibilities, region of interaction/output within the group can be calculated and deployed to individual devices in order to create the unified experience.

The process of calibration of these devices improves the coordination between the plurality of devices, because there might be disparity amongst them. The spatial relationship between devices is significant, as the location of each device is directly related to the outgoing and incoming of acoustic signals. Structurally rigid devices that contain an array of speakers or microphones make use of their spatial rigidity for calibration, and may be shipped pre-calibrated because there is guarantee that their relative spatial relationships will remain intact forever. However, for devices that are not rigidly connected to each other and can be freely arranged spatially as per the user's desire (such as a group of picture frames), there is no way for manufacturers to anticipate the spatial relationship in advance or plan for it. As a result, calibration is done at the user's end, considerably complicating the process.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Turning first to FIG. 1, an exemplary block diagram of a system having a plurality of devices including a control device is shown. According to the exemplary system 100 of FIG. 1, a plurality of devices 102-106, which may be electronic devices for example and may be arranged in a cluster as shown, are configured to communicate with each other and one or more devices external to the cluster, as will be described in more detail below. As will be described in more detail below, additional devices of a plurality of devices in cluster of devices 102-106 may be out of the Field Of View (FOV) of the control device 120, but included in the plurality of devices using computer vision techniques.

According to one implementation, the plurality of devices may be digital picture frames having a display and input/output circuitries that enable detecting inputs to one or more of the plurality of devices or generating an output. More particularly, each of the devices 102-106 comprises a control circuit 108 and one or more input or output devices, shown here as a plurality of input or output circuitries 111-114. By way of example, an input circuit may comprise a camera, a microphone, a motion detector, a depth sensor, a light sensor, a temperature sensor, or any other input circuit for receiving a signal or detecting a condition in an area near the plurality of devices. In addition to a display for displaying an image, or a medium to show a unique image, such as laser engraved on the device, or a paper image put on the device, each of the devices may comprise output devices such as one or more speakers or for displaying visual feedback, such as LED lights for example. A control device 120, which may be coupled with any type of image capturing device, such as a smart phone, tablet or any other type of electronic device having a camera or other image detection circuit, may be used to capture an image of the plurality of devices 104-106 and other devices that may be outside of the FOV of the control device 120.

Each of the plurality of devices may comprise one or more communication circuits to enable communication between the devices as well as communication with the control device 120. For example, each device 102-106 may comprise a communication circuit 116 to enable communication between the devices. Each device 102-106 may also comprise a communication device 118 to communicate with the control device 120. That is, the control device 120 can communicate with one or more of the plurality of devices to control input or output circuits based upon information related to the arrangement and capabilities of the plurality of devices determined from an image of the plurality of devices captured by the control device. An example of a control device will be described in more detail in reference to FIG. 2. While each device comprises 2 communication circuits 116 and 118, it should be understood that a single communication circuit could be implemented to enable communication with other devices and with the communication device. That is, the communication circuit 116 could not only enable communication with the other devices, but with the control device 120. Further, while each of the devices may include a communication circuit 118 that enables communication with the control device 120, it should be understood that a communication circuit 118 could be implemented in one of the devices 102-106, where that device would act as a centralized communication hub for the devices 102-106 to enable communication with the control device 120. The communication circuits 116 and 118 could implement any type of wired or wireless communication protocol. The devices can talk to each other or with the control device via Wi-Fi, RF, Zigbee, Z-wave, Near Field Communication (NFC) or Bluetooth protocols for example, including Bluetooth protocols has mesh capabilities.

An image captured by the control device 120 may be analyzed locally by the control device 120 or remotely from the control device to determine information related to the orientation of the devices 102-106, the relationship of the plurality of devices with respect to each other, and properties of the devices, such as capabilities of the devices, including the numbers, types and location of input and output circuits on the plurality of devices. The control device 120 could be any type of device having one or more sensors for detecting the orientation of the plurality of devices, the relationship of the plurality of devices with respect to each other, and properties of the plurality of devices. By way of example, the control device 120 could be a smart phone or other electronic device having a camera and other sensors that may help determining the depth of an element within a scene or the relative position of elements within a scene.

It should be noted that, under some circumstances, the control device could operate to provide input and output devices as a part of the plurality of devices, and therefore receive inputs from or generate outputs to a user interacting with the plurality of devices. However, the use of the control device as another device in the plurality of devices may depend upon whether it is in a stationary or moving state. In a stationary state, the control device may act as a device in the cluster. For example, in a surround sound application, the control device can act as another "speaker" (e.g. the speaker of a smart phone). This assumes that while in the process of calibrating the cluster, the control remains within a certain range of the point of calibration (position and orientation remains unchanged from when the instance calibration happened). Given that the person is calibrating at position (Xp, Yp) in a room, and the control device is at (Xs, Ys, Zs) (a three-dimensional point), then if the control device is needed to be part of the cluster to act as another device, it needs to be within a certain range of the original position of calibration (Xs, Ys, Zs). When the control device is moving and all or part of the cluster is within its camera's field of view, it can still continue to be part of the cluster, providing spatially relevant output. When the control device is moving but the cluster is not within its camera's field of view it can no longer be a part of the cluster, but it can act as a device that controls the cluster independent of the proximity to the cluster. The control can include configuring the type of application, or modifying the behavior of the acoustic field for example.

It should be noted that, in one embodiment, the system could be recalibrated by changing the settings such as sensitivity, frequency or other acoustic related parameters. Recalibration may also be performed to morph or adjust the sensitivity space/acoustic field depending on the application, such as switching from voice detection/localization/input to gesture or surround sound for example. The information of the different devices and their spatial relationship are already stored in the first instance (i.e. the original calibration). An application switch can happen depending on the intention of the user and can be controlled by the control device, a device in the cluster or some other device that processes or transmits the information to the rest of the cluster. This recalibration or modification of the acoustic field may be based on the original calibration, since in the calibration the spatial relationship between devices, as well as their individual capabilities are computed.

For a given cluster of spatially separated freeform acoustic devices, which includes acoustic components such as microphones or speakers, the methods and systems set forth below improve the quality and speed of calibration using visual cues and spatial relationship as additional input, and reduce the complexity of the calibration procedure and improve the usability of the experience so consumers can perform calibration for their own device setup. According to some implementations, the methods and systems may use Computer Vision (CV) and Augmented Reality (AR) to calculate the spatial relationship between the cluster of devices in the form of a spatial map which may be stored in local memory or to the cloud. The spatial map may also calculate the relative position of each acoustic component (speaker and/or microphone) not just within the space of the device itself, but also within the space of the cluster of devices as a whole. When all of the devices to be calibrated are not in the FOV of the control device, it is possible to capture locations of other devices at separate times or frames and tie them back together through solutions such as Simultaneous Location and Mapping (SLAM). This spatial map may then be used as an input for calibration processes. Moreover, because the different types of devices are identified, the acoustic properties of each of their components can be determined, creating a common ground for calibration.

In one embodiment, the calibration process may perform regular acoustic calibration sub-processes to analyze the acoustic field, estimate regions in the field that need to be adjusted for a normalized field, use the spatial map to locate the respective speakers and microphones that would affect the regions and modifies them until the desired result is achieved. The previous step may be repeated until all of the devices in the cluster is surrounded by a normalized acoustic field, which is a 3D region. In another embodiment, the calibration process may perform similar sub-processes to adjust the acoustic field of the cluster of devices to achieve a desirable field, including non-unified field.

Furthermore, by having a spatial mapping of the devices, and with the knowledge of their acoustic configuration (i.e. types and location of input and output circuits) without calibration of the devices yet, the map gives reference of how the individual acoustic fields interact with each other. This allows a control device to infer where there is the optimal interaction or reception point for given arrangement of devices for a diverse range of applications. A device of the plurality of devices may detect that a user is interacting with that device, which would become an active device. For example, it may be determined that the user is in front of the device, and therefore provide information for the user on a display of the active device. Accordingly, the methods and systems not only ease the calibration process of acoustic enabled devices to improve the speed and quality of the calibration through the use of visual cues and spatial relationship, but also allow for a larger spectrum of applications through clustering.

Figure 2:
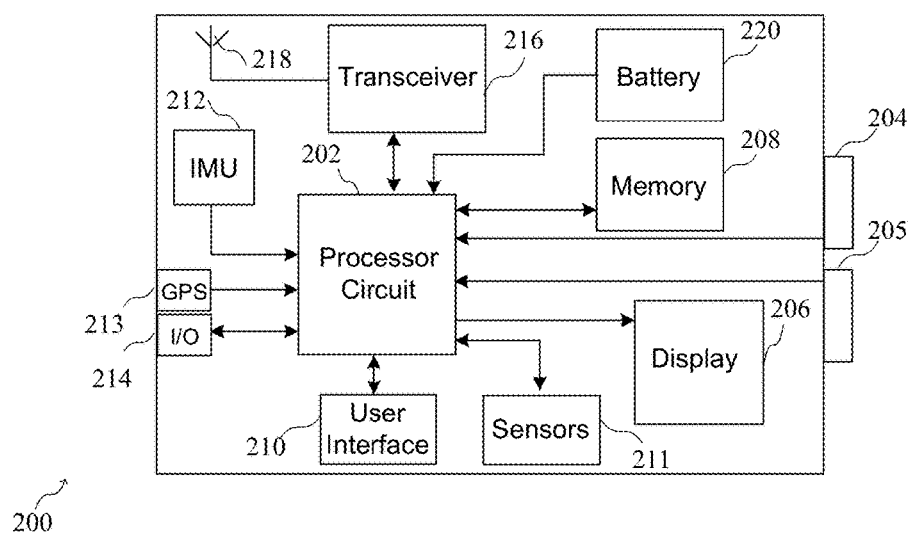
FIG. 2 is an exemplary block diagram of a control device.

Turning now to FIG. 2, an exemplary block diagram of a control device is shown. The exemplary control device 120 may be any type of electronic device coupling to one or more imaging devices to capture images of a plurality of devices for calibration of the plurality of devices, as will be described in more detail below. The mobile device 200, as an implementation of the control device 120, may comprise a processor circuit 202 coupled to a plurality of cameras 204 and 205. The mobile device 200 could be any type of device adapted to transmit and receive information, such as a smart phone, tablet or other electronic device receiving or providing information, such as a wearable device. The processor circuit 202 could be an ARM processor, an X86 processor, a MIPS processor, a graphics processing unit (GPU), a general purpose GPU, or any other processor configured to execute instructions stored in a memory. The processor circuit 202 could be implemented in one or more processing devices, where the processors may be different. For example, the electronic device could include a central processing unit (CPU) as well as a GPU for example.

The processor circuit 202 may be coupled to a display 206 for displaying information to a user. The processor circuit 202 may also be coupled to a memory 208 that enables storing information related to data or information associated with achieving a goal. The memory 208 could be implemented as a part of the processor circuit 202, or could be implemented in addition to any cache memory of the processor, as is well known. The memory 208 could include any type of memory, such as a solid state drive (SSD), Flash memory, Read Only Memory (ROM) or any other memory element that provides long term memory, where the memory could be any type of internal memory of the electronic drive or external memory accessible by the electronic device. By providing a local memory, user preferences and other information which a user may desire to keep private is not compromised.

A user interface 210 is also provided to enable a user to both input data and receive data. Some activity tracking may require user's manual input. The user interface could include a touch screen user interface commonly used on a portable communication device, such as a smart phone, smart watch or tablet computer, and other input/output (I/O) circuits, such as a speaker and a microphone. The user interface could also comprise devices for inputting or outputting data that could be attached to the mobile device by way of an electrical connector, or by way of a wireless connection, such as a Wi-Fi, RF, Zigbee, Z-wave, Near Field Communication (NFC) or Bluetooth connection. A user may also be able to log on to an account associated with an app that tracks a user's progress in achieving a goal.

The processor circuit 202 may also be coupled to other circuits that receive input data or provide data, including various sensors 211, an inertial measurement unit (IMU) 212 and a Global Positioning System (GPS) device 213 for activity tracking. The sensors 211 could include any type of sensor, in conjunction with or separate from the camera, that can detect the location or movement of a person (such as for gesture detection for example). The inertial measurement unit (IMU) 212 can provide various information related to the motion or orientation of the device, while GPS 213 provides location information associated with the device. The sensors, which may be a part of or coupled to a mobile device, may include by way of example a light intensity (e.g. ambient light or UV light) sensor, a proximity sensor, an environmental temperature sensor, a humidity sensor, a heart rate detection sensor, a galvanic skin response sensor, a skin temperature sensor, a barometer, a speedometer, an altimeter, a magnetometer, a hall sensor, a gyroscope, WiFi transceiver, or any other sensor that may provide information related to achieving a goal. The processor circuit 202 may receive input data by way of an input/output (I/O) port 214 or a transceiver 216 coupled to an antenna 218. While the control device of FIG. 2 is shown by way of example, it should be understood that additional elements or a different combination of elements could be implemented to provide a calibration of the devices.

Figure 3:
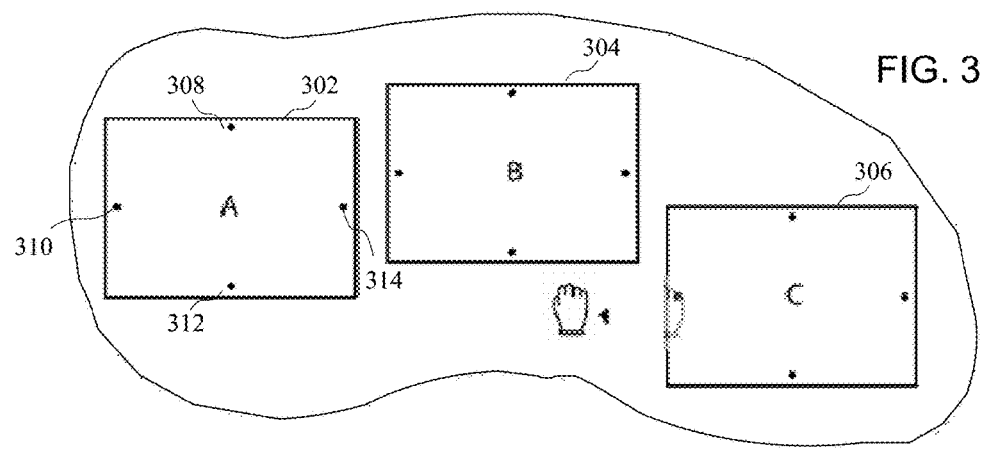
FIG. 3 is an exemplary diagram showing a plurality of devices adapted to receive an input shown by way of example as a gesture.
Figure 4:
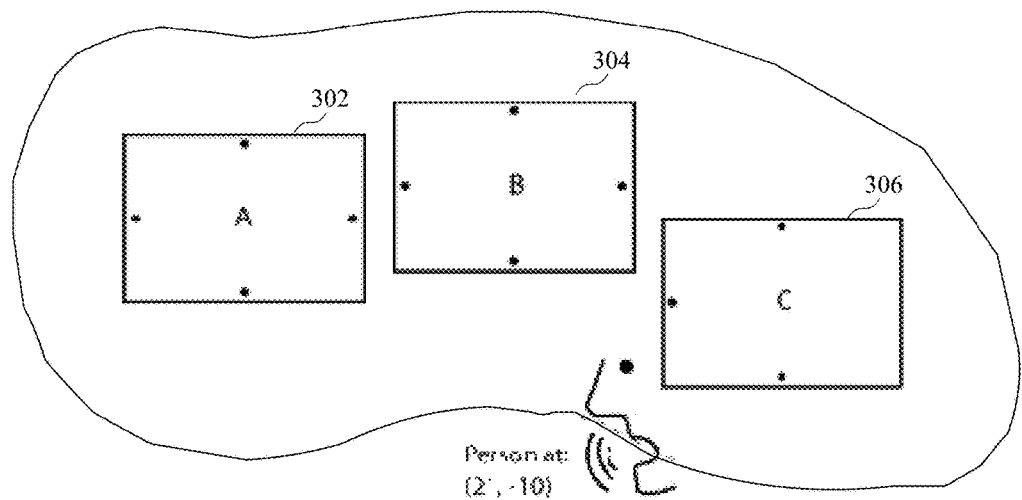
FIG. 4 is an exemplary diagram showing a plurality of devices adapted to receive an input shown by way of example as a verbal input.

Turning now to FIGS. 3-5, a plurality of devices may be adapted to receive inputs, which are shown by way of example as a gesture in FIG. 3, or a voice input in FIG. 4. According to the exemplary implementations of FIGS. 3 and 4, three devices 302-306 have one or more input or output circuit, shown here by way of example as a first circuit 308, a second circuit 310, a third circuit 312 and a fourth circuit 314. The first through fourth circuits 308-314 belonging to device 302 could include any combination of input or output circuits, and could include circuits that are combined input/output circuits. While the first through fourth circuits 308-314 are shown distributed around the perimeter of the devices in the exemplary embodiment of FIGS. 3-5, it should be understood that a different number of input and output circuits could be implemented on the devices, and implemented in different configurations and locations within the devices.

Figure 5A:
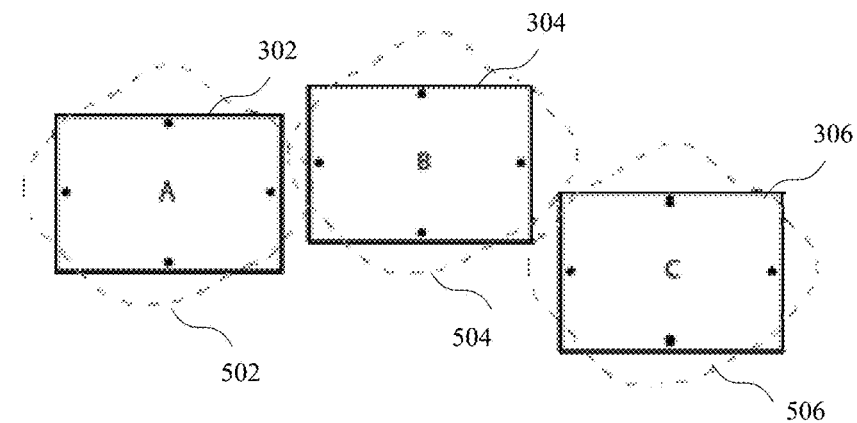
FIGS. 5A and 5B are exemplary diagrams of a plurality of devices that are calibrated to create a coordinated field for receiving inputs at sensors or generating outputs.
Figure 5B:
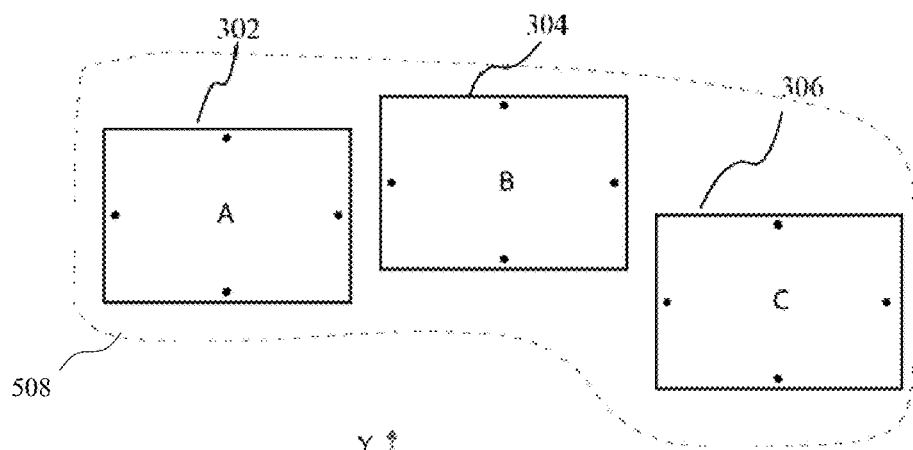

As shown in FIGS. 5A and 5B and will be described in more detail below, the input and output circuits can be calibrated to provide a field (defined by the dashed line in the examples) within which input circuits will generally detect inputs (e.g. voice or gestures) or output circuits will generate outputs (e.g. audio or visual outputs). More particularly, the individual devices 302-306 have corresponding fields 502-506 that receive input signals or generate output signals, as shown in FIG. 5A. Without calibration, the individual acoustic fields may interfere with each other. But by calibrating with the knowledge of their spatial relationship of the various input and output circuits of the devices, an acoustic field 508 for the plurality of devices can be created as shown by the dashed lines in FIG. 5B. In the case of input circuits implemented on the devices 302-306, at least one input circuit on a device would detect an input, such as a camera or other sensor that would detect a certain motion associated with a gesture by a person in front of the devices 302-306 for example, or a microphone to detect a sound, such as a voice from a person next to the devices 302-306. That is, one of the input circuits acting as an input sensor will detect an input provided in the acoustic field 508 defined by the dashed line, or a person in the acoustic field 508 defined by the dashed line may be more likely to detect an output from the plurality of devices, such as hearing a sound.

Depending on the application being implemented with the devices, different kinds of acoustic fields, ranging from a fully uniform region to non-uniform (with regions strategically increased in sensitivity and other parameters), may be desired. Unlike when performing calibration without knowing the spatial relationship between devices and the external environment, using computer vision to infer a spatial relationship for calibration allows each device to be treated as a single virtual sensor or audio component, which is comprised, subsequently, of a group of real audio and/or visual components.

The calibration technique can therefore allow for better and more user-friendly calibration processes, and can have impact on several application areas in the field of consumer electronics. A well distributed and normalized execution area around the cluster enables applications adapted, for instance, to receive voice and gesture inputs. For example, applications based upon voice inputs can be improved based upon voice localization. In voice input scenarios, speaking to a single device is not a problem because the device is always listening and will respond to the voice input. However, in the case of multiple devices, determining which specific device the user is speaking to can be problematic. In a conventional arrangement without any audio localization, all the devices might be awoken, and therefore duplicating the results of voice detection. However, with audio localization associated with a well distributed and normalized execution area, it is possible to estimate the device closest to the user and target voice commands directed to that device. It is also possible to, for example, detect gestural input using Doppler effect for example by employing multiple microphones and speakers emitting audio at high frequency.

However, the distance of interaction is limited by the device's capabilities. Furthermore, based on the distance between devices and the quality of calibration, it is possible to have gaps in the sensing field in the region between these devices. A well distributed and normalized execution area that encompasses all among the cluster of devices will enable an interaction at a larger scale. Such gestures may include discrete inputs (e.g. swipes) or absolute inputs (e.g. pointing). For example, a user could point at one display, grab the image shown in that display, move their hands to point to another display in the cluster and drop the image there. This interaction would be implemented best with a well distributed sensing system encompassing the cluster as a whole.

Figure 6A:
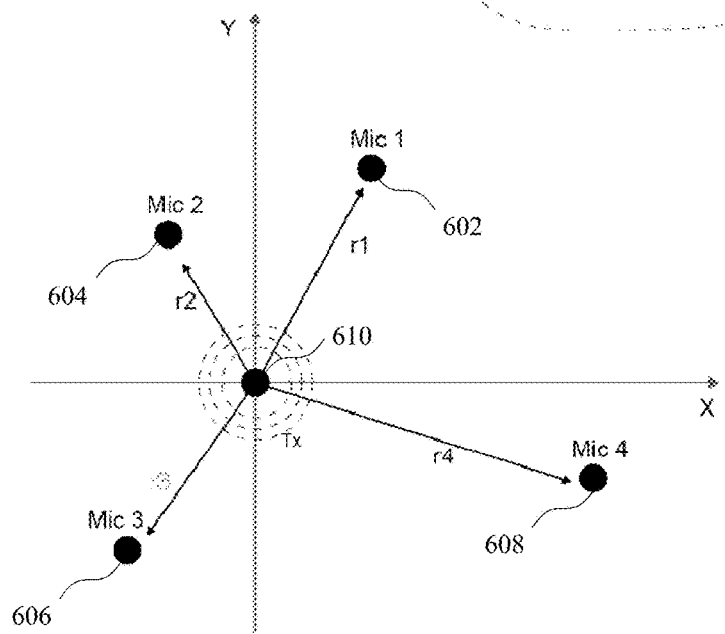
FIGS. 6A and 6B are exemplary diagrams showing the generation of a composite audio signal generated by a plurality of microphones.
Figure 6B:
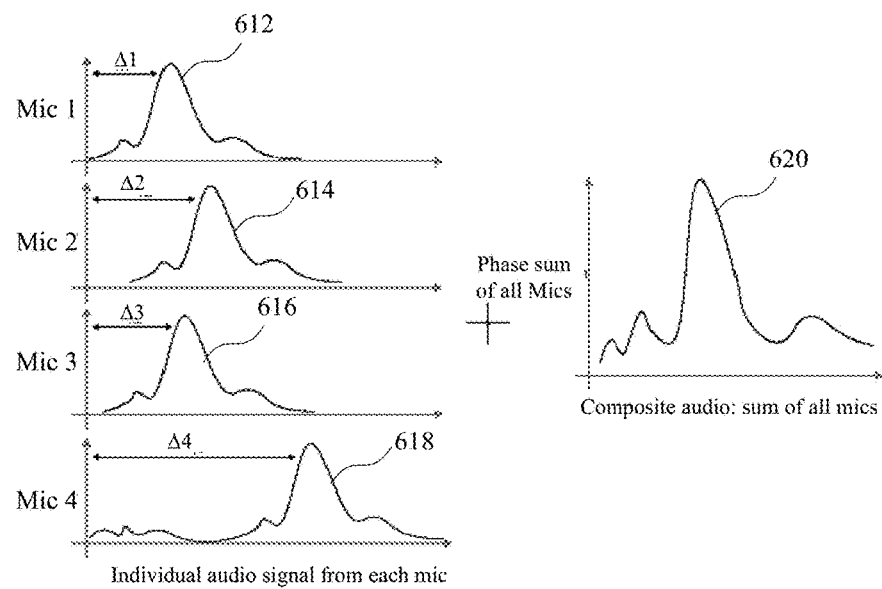
Figure 7:
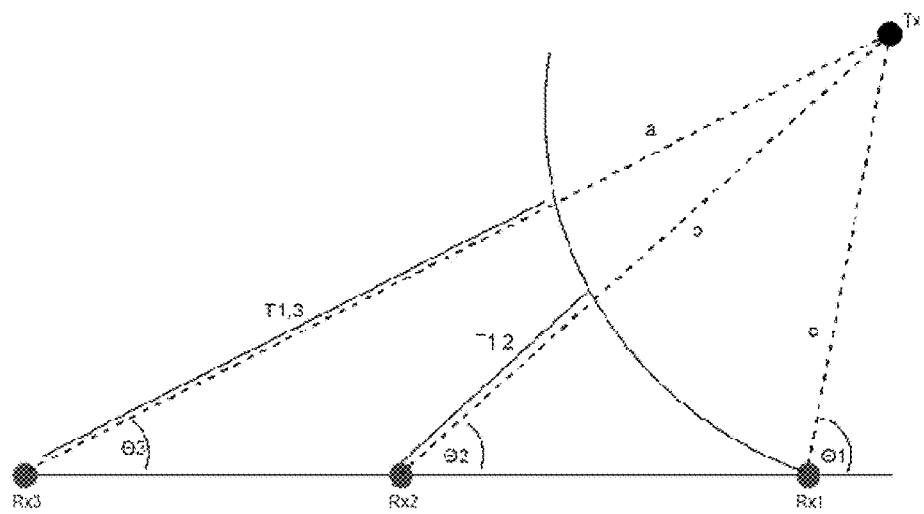
FIG. 7 is an exemplary diagram showing the reception of an audio signal from a transmitter at a plurality of receivers.

Turning now to FIGS. 6A, 6B, and 7, the exemplary receipt of a transmitted signal at multiple microphones is shown. FIG. 6A illustrates an arrangement of audio receptors (for example, microphones), each having a specific distance towards a particular point in the space, and a single transmitter Tx emitting a generic audio signal. Audio signals, as well as other forms of wave signals, have a specific velocity in the air, surface or in a generic conductive medium. For simplicity, FIG. 6A shows an arrangement in 2D space, but it should be appreciated by ordinary people skilled in the art that the arrangement may extend to a 3D space. When an audio signal is originated from transmitter Tx at a particular point, it requires time to reach to the receptors, such as a microphone 602 (Mic 1), a microphone 604 (Mic 2), a microphone 606 (Mic 3), and a microphone 608 (Mic 4). Given that each receptor has a different distance (designated at R1-R4 for Mic 1-Mic 4, respectively) relative to the transmitter (Tx) 610, which is situated in the origin of the space, the signal received by each one of the microphone will be time shifted, which in turn, in the frequency domain it will be phase shifted. That is, the received signal is the same across them but with a delay, omitting signal attenuation since the signal shape will be similar across the devices. A more detailed example is shown in FIG. 6B, where the signal is shown in time spectrum for each of the microphones. Each of the signal received at the receptor has a time delay depending on the distance from the receptor to the transmitter Tx. In the example, since Mic 1 is closer to the transmitter Tx, it picks up the signal first as shown in the waveform 612, next is Mic 3 as shown in waveform 616 with a delay Δ3, next is Mic 2 as shown in waveform 614 also with a delay Δ3, and then Mic 4 with a delay Δ4 as shown in waveform 618, where Δ2, Δ3, and Δ4 are greater than Δ1. Also, in FIG. 6B, a composite audio signal 620 is shown on the right of the figure, generated by the sum of all microphones from FIG. 6A. With the signal received from the microphones, the difference in time and frequency, as well as other signal parameters, can be obtained. The difference in signals allows acoustic localization of the source of the audio in the space, where in this example, it is called TOA (Time of Arrival), since the difference of delay in time is used. Knowing the location of the microphones, and knowing the difference in time delay of each received signal, it is possible to locate the source. Another implementation of acoustic source localization is shown in FIG. 7, where the angle and direction is being used instead of time (shown in FIG. 6) which is called DOA (Direction of Arrival), instead of using the time difference. As shown in FIG. 7, the angle θ1, θ2, and θ3 are detected for each of the receivers Rx1, Rx2, and Rx3, respectively, for the transmitter Tx. It should be noted that other methodologies for localization can be applied, and not only in the acoustic domain. Such methodologies might be maximum-likelihood (ML) techniques, multiple signal classification (MUSIC) techniques, and minimum-variance distortionless response (MVDR) techniques, Time of Flight (ToF), etc.

The concept of acoustic source localization is important in applications that requires calibration such as detecting how far the control device with respect to the cluster of devices, or how the different arrangements of the devices affect the interaction with each other's acoustic components, either microphone or speaker. However, the analysis of how an acoustic signal travels and interferes with other components is very resource consuming, and varies depending on the type of environment, resulting in an error-prone analysis and calibration. Furthermore, in the case of interacting one device with others, it is important to know the type of those other devices and their positioning. Therefore, in order to detect how such components react with other nearby components to calibrate the different individual acoustic fields, it is beneficial to be able to understand the spatial arrangement of such devices, and also methods to identify the devices and collect the information of such devices, and inherently also the devices' acoustic components.

Figure 8:
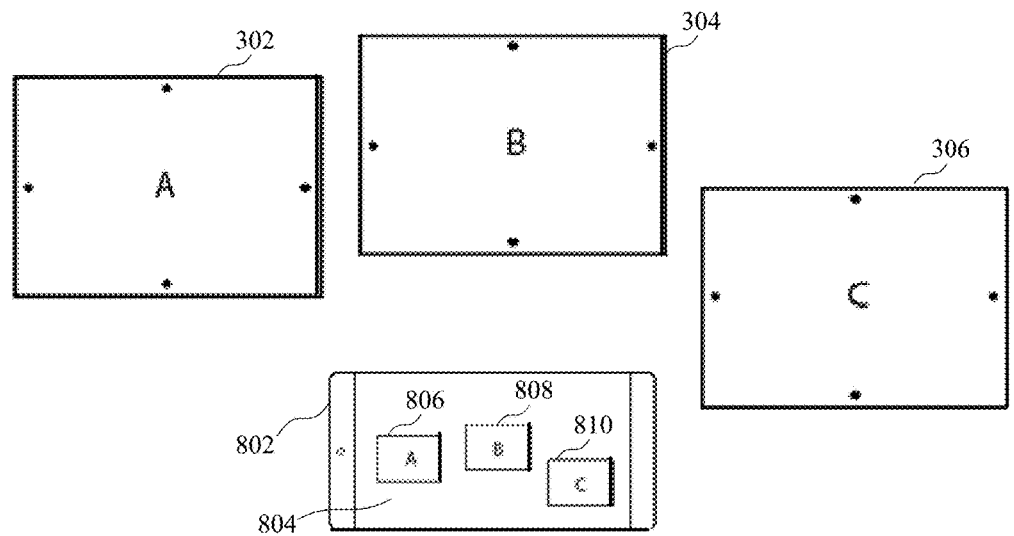
FIG. 8 is an exemplary diagram illustrating a control device capturing an image of a plurality of devices.
Figure 9:
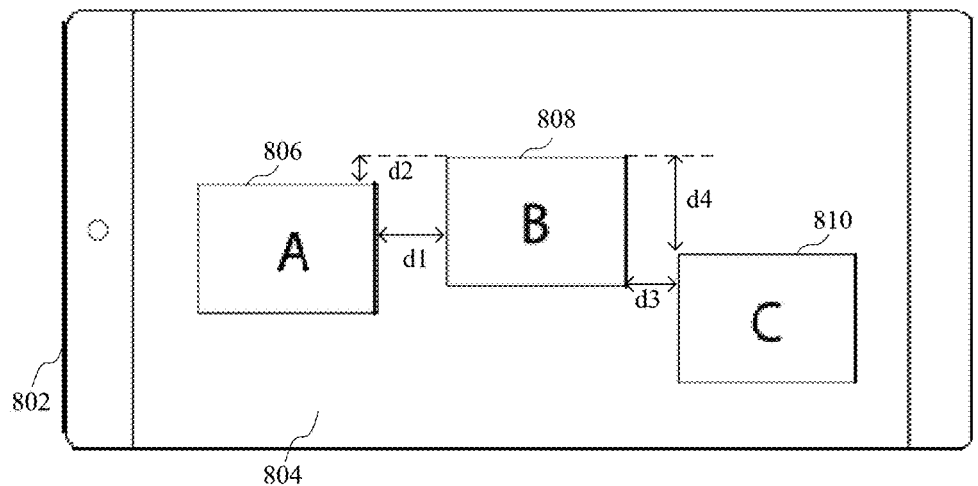
FIG. 9 is an expanded view of a display of the control device of FIG. 8 showing the relationship of the plurality of devices.

Turning now to FIGS. 8 and 9, examples of a control device capturing an image of a plurality of devices, and a determination of the relative position of the devices captured are illustrated. As shown in FIG. 8, the devices 302-306 are captured by a control device 802, which may be a smart phone for example. As shown on a display 804 of the control device 802, image portions 806, 808, and 810 correspond to devices 302, 304, and 306 respectively. In one embodiment, each of devices 302-306 is visually distinct from each other and is showcasing a unique recognition pattern known as an image target. The image target may be either a physical image that is posted or mounted on the device, or a digital image displayed by the device. The reference images for these image targets are accessible by all the devices in the network, including the control device 802. In one embodiment, devices 302-306 are network enabled and may be in constant communication with the control device 802, and can send updates with comprehensive information such as the device ID, device model and/or type, device size, network address, reference name of the present image target, URL to the respective image target, number of input or output components and their relative positions, as well as their parameters such as sizes, range, sensitivities, or frequency range, etc. The control device 802 then assimilates all the information from these devices, accesses reference images either from disk or from the provided URL, and uses computer vision technology to scan its image sensor feed for a match of the reference images with those image targets. When matches are found, image portions 806, 808 and 810 are rendered as mentioned above. Additionally, 3D computer vision techniques may be used to compare the reference image and the captured image target, calculate the perspective transformations that needed to transform one to the other and estimates the 3D position, orientation and scale of the image targets and thereby that of the corresponding devices 302-306 with respect to the image sensor in the control device 802. Distance between any of the devices 302-306 and the control device 802 can be determined accordingly. In one embodiment where the devices 302-306 do not have physical displays present or are unable to provide an image target, other identification techniques can be used. One example is combining generic computer vision with object recognition to identify the type of device in the FOV. After identifying the different types of devices, each device of the devices 302-306 emits a particular acoustic signal in a time multiplexed manner. That is, each device is assigned a particular time to emit a specific acoustic signal for identification.

Once the individual 3D positions of the devices 302-306 with respect to the image sensors in 802 are obtained, their relative position and orientation with respect to each other can be inferred to create a spatial map. The spatial map allows calculation of distance between devices in the cluster captured by the control device 802. Since each of the devices 302-306 is a rigid body with each of its internal components in a fixed place within the frame of the body, we know a priori the relative position and orientation of each component with respect to the frame of a particular device. Including the information about the position and orientation of a component with respect to its host device into the spatial map, combining that with the relative position and orientation of a device with respect to the cluster, the relative position and orientation of each input or output component, such as one or more microphones or speakers, with respect to the cluster can be determined. In essence, the spatial relationship between any input and/or output component of any device in the cluster to any other input and/or output component of any other device in the cluster can be calculated using the spatial map. According to one implementation, a relationship of the plurality of devices can be determined based upon determined distances between edges of the devices as shown in the expanded view of a display of the control device in FIG. 9. For example, the relationship between devices 302 (represented by image portion 806) and the device 304 (represented by image portion 808) can be represented by a distance d1 between side edges of the devices and a distance d2 between top edges of the devices. Similarly, the relationship between devices 304 (represented by image portion 808) and the device 306 (represented by image portion 810) can be represented by a distance d3 between side edges of the devices and a distance d4 between top edges of the devices.

Figure 10A:
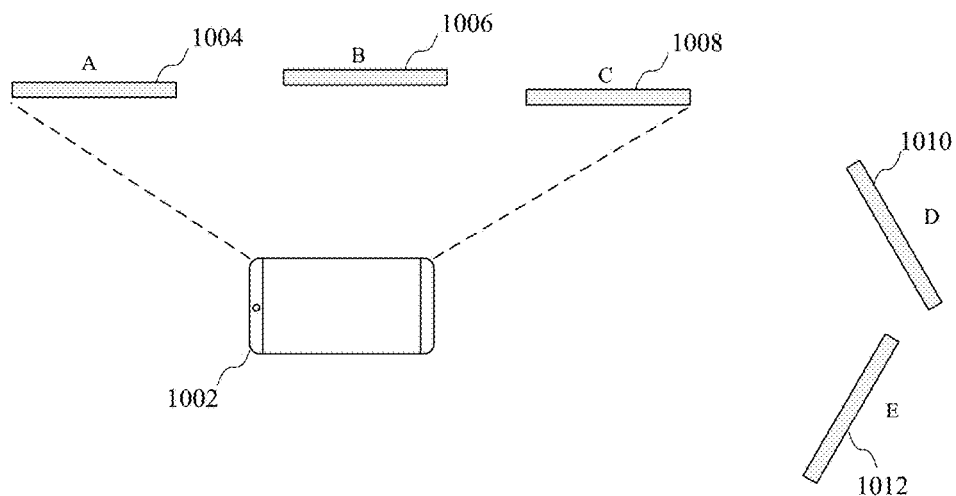
FIGS. 10A and 10B are exemplary diagrams showing a process of determining a relationship of devices out of a field of view of a control device.
Figure 10B:
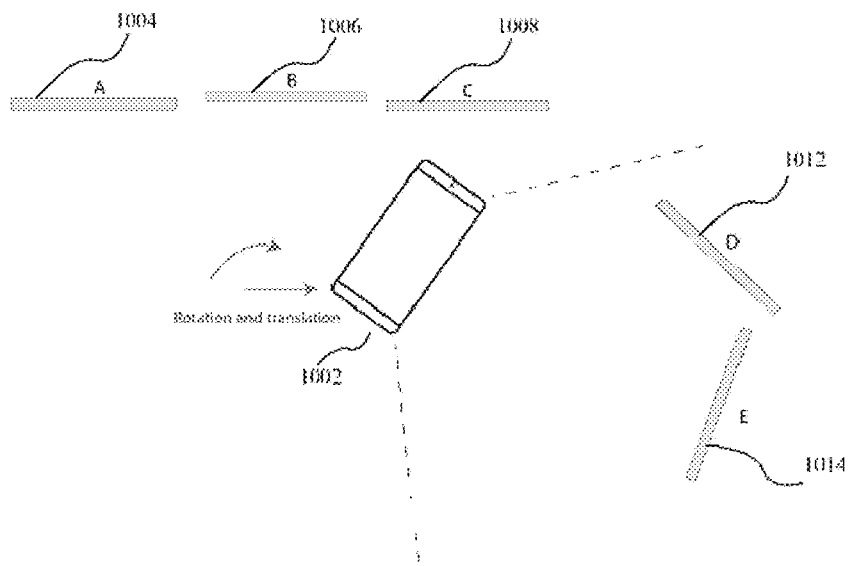

Turning now to FIG. 10A and FIG. 10B, a diagram shows a process of determining a relationship of devices out of the FOV of a control device. That is, a control device 1002 may be able to capture 3 devices 1004-1008 in a FOV of the control device, but not able to capture devices 1012-1014 outside of the FOV. The image target is important to estimate the position and orientation of devices 1004-1014 with respect to the control device 1002. In FIG. 10A, device 1002 is positioned and oriented in such a manner that devices 1004-1008 are within its FOV, but not devices 1012-1014. Since devices 1004-1008 are within the FOV of 1002, using their image targets, their position and orientation are estimated. However, as the image targets of devices 1012-1014 are outside of the FOV of 1002, their positions and orientations cannot be estimated. When device 1002 moves and turns to the right, the position and orientation of devices 1012-1014 can be calculated, but not devices 1004-1008. As a result, estimating the position and orientation of the devices of the complete cluster comprising devices 1004-1014 becomes a difficult task, especially since control device 1002 has also moved. Recently, new algorithms, such as Simultaneous Localization And Mapping (SLAM), have been developed in computer vision allowing a camera enabled device to move about an unknown environment while recording imagery to stitch these imagery together to generate a 3D model of the environment, and to calculate the path traveled by such a device along with its position and orientation relative to the environment. As a result, when control device 1002 moves and turns from one position to another, as shown in FIG. 10B, it can determine the relative transformations required to go from its start point to the end point. Taking advantage of the determined relative transformation information, the position and orientation of devices 1004-1008 can be tied with the position and orientation of devices 1012-14, allowing the generation of a spatial map of these spatially-separated cluster of devices 1004-1014 without having to capture them all in a single frame. Therefore, the location of devices 1012-1014 with respect to devices 1004-1008 can be determined, which is very helpful when devices spread on different walls and are perpendicular to each other, or are scattered in a large room. By way of example, the image of the device could be compared to known devices, using machine learning for example, to determine the type of device, and so are the capability of the devices.

Figure 11:
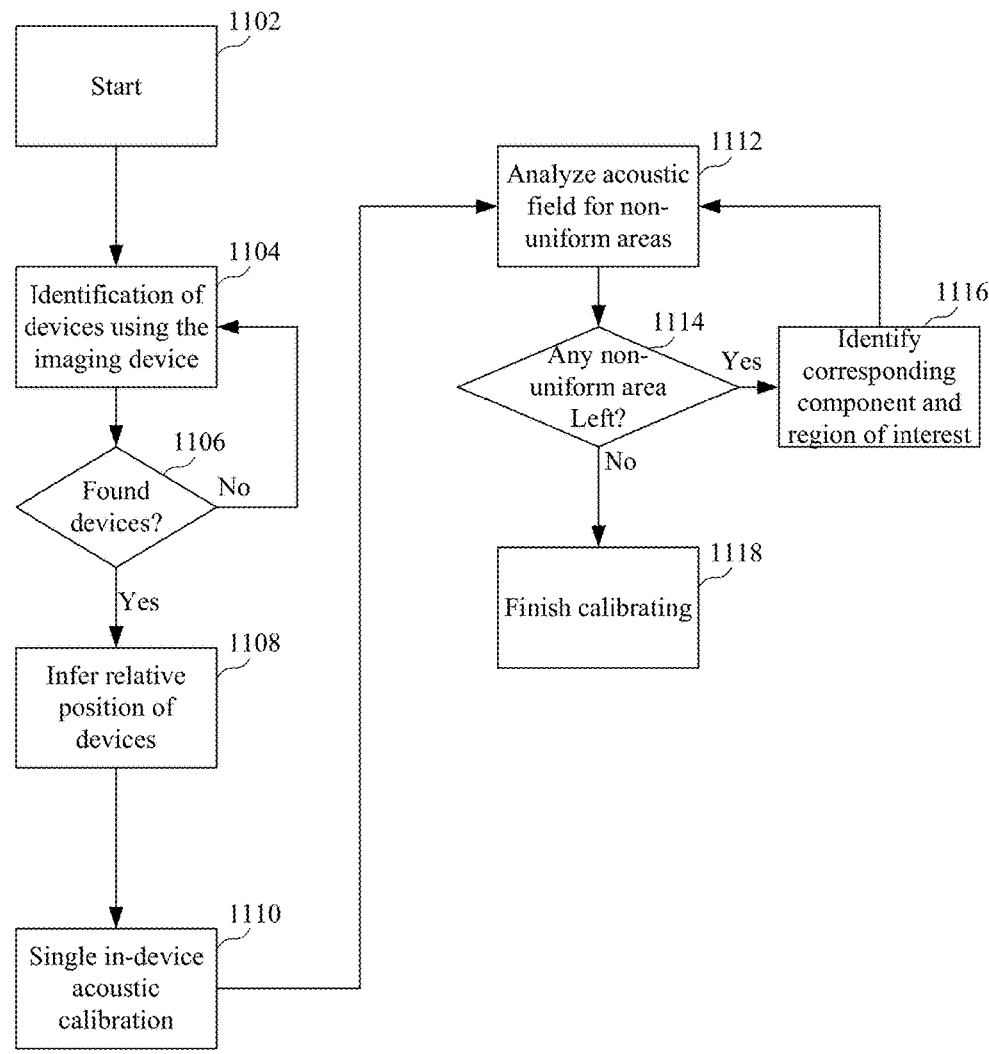
FIG. 11 is an exemplary flow diagram showing a method of managing a plurality of devices.

Turning now to FIG. 11, a flow diagram shows a method of controlling a plurality of devices in an arrangement. According to the method of FIG. 11, the process is started at a block 1102, where devices are then identified using an imaging device, such as a control device as set forth above, at a block 1104. The process of identification may use a combination of computer vision techniques, image recognition and/or object recognition. The identification of devices continues until devices are found at a block 1106. Once the devices are identified, the communication between the control device and the devices in the cluster is set up, to exchange information of the devices, such as acoustic components configuration, the number of acoustic components or their acoustic parameters. The relative position of the devices is then inferred from the image at a block 1108. Single, in-device calibration of the input and output devices is then performed at a block 1110, and the acoustic field is analyzed for non-uniform areas at a block 1112. If non-uniform areas are found at a block 1114, the corresponding component and region of interest is identified at a block 1116, and the acoustic field continues to be analyzed for non-uniform areas at the block 1112. If no non-uniform areas are remaining at block 1114, the calibration is finished at block 1118.

Figure 12:
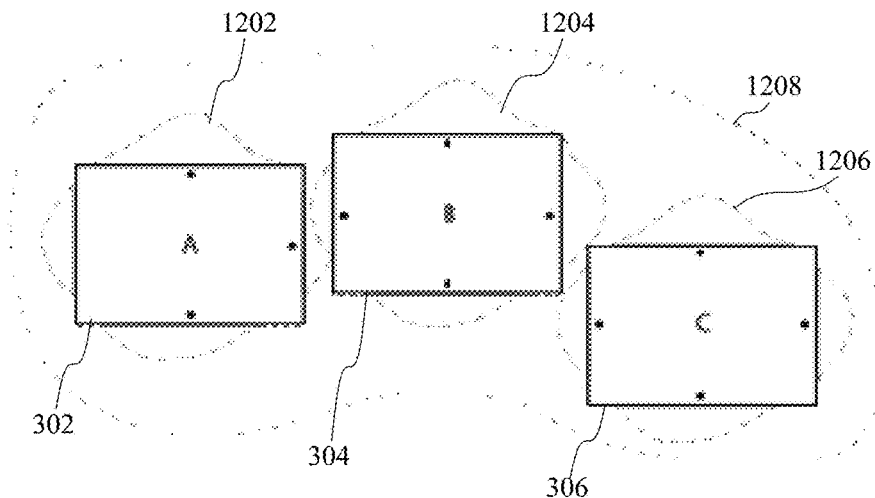
FIG. 12 is an exemplary diagram illustrating a coordinated field for receiving inputs or generating outputs.

Turning now to FIGS. 12-14, diagrams of fields for receiving inputs at a sensor or generating outputs using calibration are shown. In FIG. 12, the control device has identified each of the individual devices 302-306 in the cluster, and is ready to analyze and obtain the individual acoustic fields 1202-1206 associated with the respective devices 302-306. Upon determining the 3D arrangement of devices 302-306 and information of acoustic parameters of such devices and their acoustic components, a normalized and calibrated field shown as acoustic field 1208 can be determined. With the prevalence of 2D interfaces such as mouse, trackpad, touchpad, touchscreen etc., users have become accustomed to interacting within a uniform rectangular space. If the acoustic field is a non-uniform, non-rectangular shape, interactions could become very confusing for the user, especially for applications that use accurate position of the hand for gestural input. It is therefore, in one embodiment, beneficial to modify the acoustic field, extending certain areas and compressing certain areas, to get it as close to a rectangle as possible, or other shapes depending on the type of application the cluster of devices is intended for. It should also be noted that the methods of determining the relative positions of the device with respect to one another can be applied to 3 dimensional (3D) arrangements.

Figure 13A:
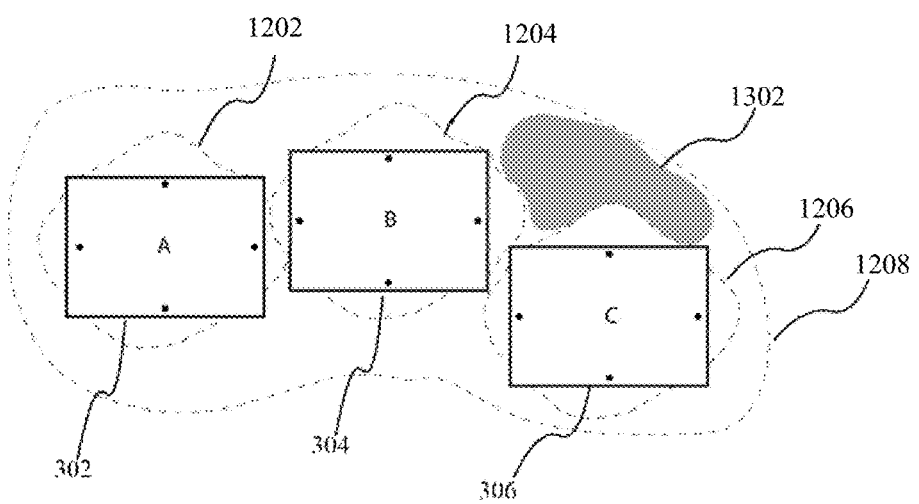
FIGS. 13A and 13B are exemplary diagrams showing an optimized region of the coordinated field for receiving inputs or generating outputs of FIG. 12.
Figure 13B:
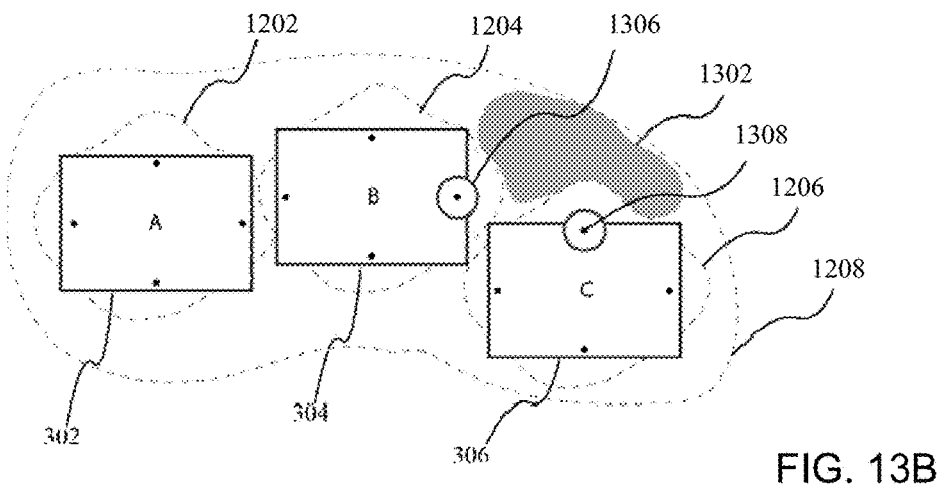

In FIGS. 13A and 13B, it is shown the process of identifying and executing for calibration to reach the intended acoustic field for the cluster. As mentioned in FIG. 12 above, the control device, after identifying the devices and their acoustic components, obtains a normalized field. With the information of each component from each device 302-306, the process of reaching the intended acoustic field 1208 from the individual acoustic fields 1202-1206 can be achieved in an iterative manner, by identifying the components that affect a particular region of the intended cluster acoustic field. For example, FIG. 13A shows a particular region 1302 of the cluster acoustic field 1208. By using the special map which includes information gathered regarding the devices and their components, as well as their arrangements in the space, it is possible to identify that acoustic components 1306 associated with device 304, and 1308 associated with device 306, are the ones that affect the particular region 1302. The acoustic parameters of each identified component, thus, can be modified to change the effect of region 1302 on the acoustic field 1208. These parameters can be, but are not limited to, gain, sensitivity and frequency response, etc.

Figure 14A:
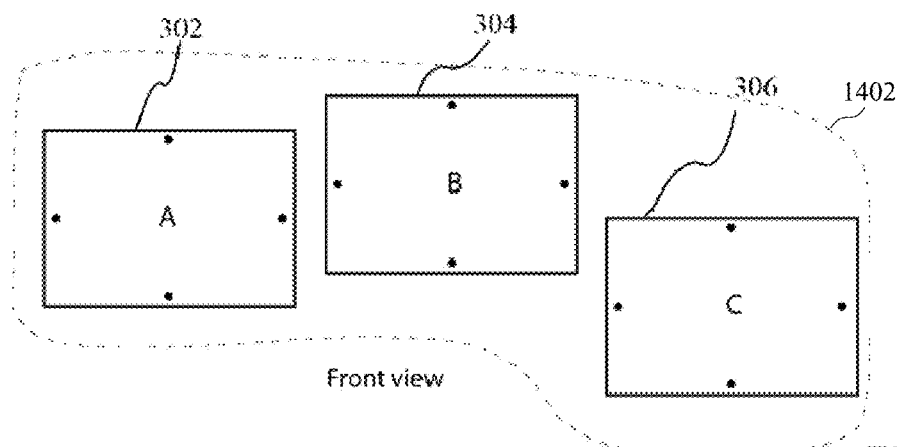
FIGS. 14A and 14B are exemplary diagrams showing a 3D arrangement of devices for receiving inputs or generating outputs.
Figure 14B:
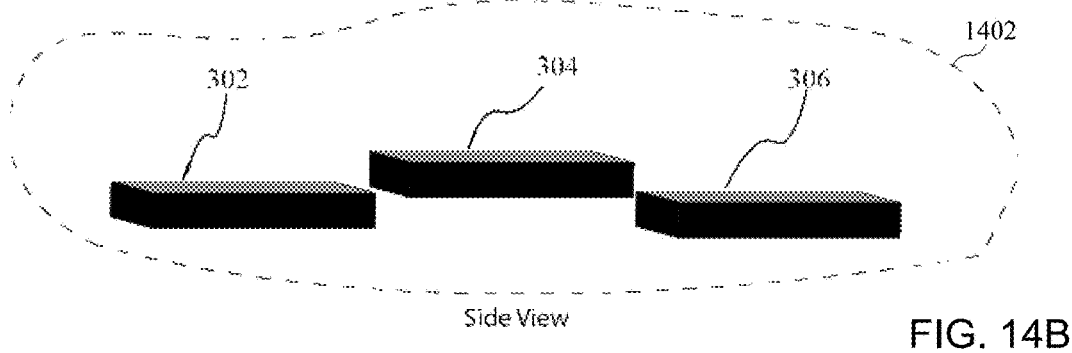

FIG. 14A and FIG. 14B illustrate the 3D nature of the acoustic field. FIG. 14A shows a front view demonstrating the relationship between the devices 302-306 and an associated acoustic field 1402 (shown by the dashed lines), and FIG. 14B shows a side view of the devices 302-306 with the associated acoustic field 1402 (shown by the dashed lines) in another dimension. In situations such as gesture recognition, not only the X-Y spread of acoustic field is important, but also the depth of the acoustic field as it can define what is the maximum distance at which a user can perform gestural interaction with the cluster. Similarly, in case of a surround sound music system, the user is not necessarily at the same plane as the cluster of speakers, therefore it becomes important to modify the acoustic field in all dimensions, including the one normal to the plane in which the cluster is present.

Figure 15A:
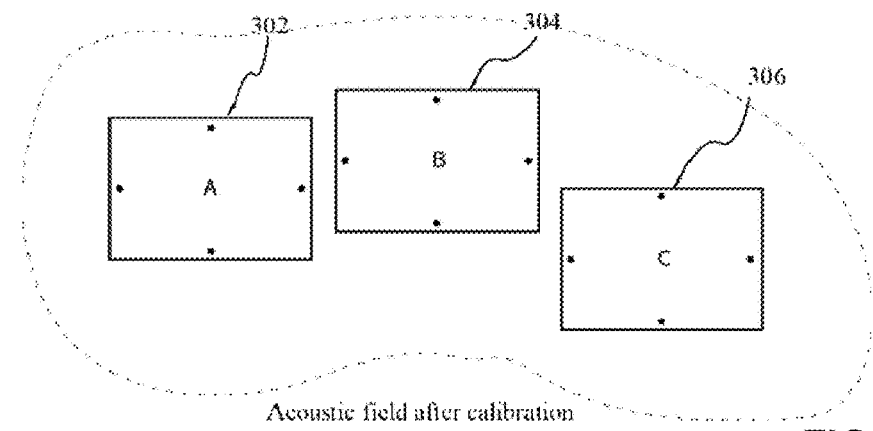
FIGS. 15A, 15B and 15C are exemplary diagrams showing different coordinated regions associated with a plurality of devices.
Figure 15B:
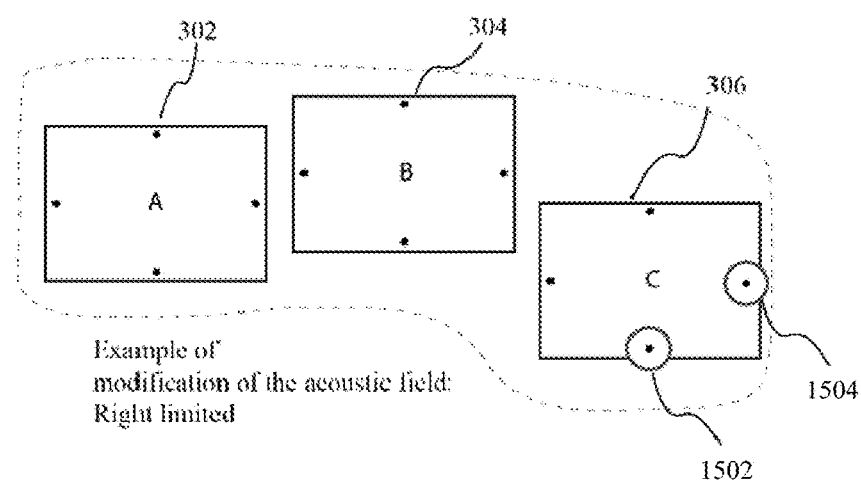

Turning now to FIGS. 15A and 15B, an exemplary diagram shows how different fields associated with a plurality of devices can be created based upon calibration. Each device in the cluster of devices might have one or multiple audio components. For example, in the case of audio components comprising microphones, in a conventional arrangement, the sensitivity of audio components is normalized to the same level because in most applications, a uniform and normalized area of sensing is required. However, using the calibration techniques set forth above, it is possible, depending on the context or the application, to later modify the acoustic parameters, such as level, gain, or sensitivity, to adjust the acoustic field around the component. When the component is a part of an array of components, modifying these parameters can serve as a way to reshape the acoustic field of the cluster, such as stretching or tweaking the acoustic field to distribute in a certain direction. The modifications of the such parameters related to the acoustic performance can be achieved by either dynamic hardware (HW) and/or software (SW) tuning, normally through the Digital Signal Processor (DSP) or the software layer of the device.

Figure 15C:
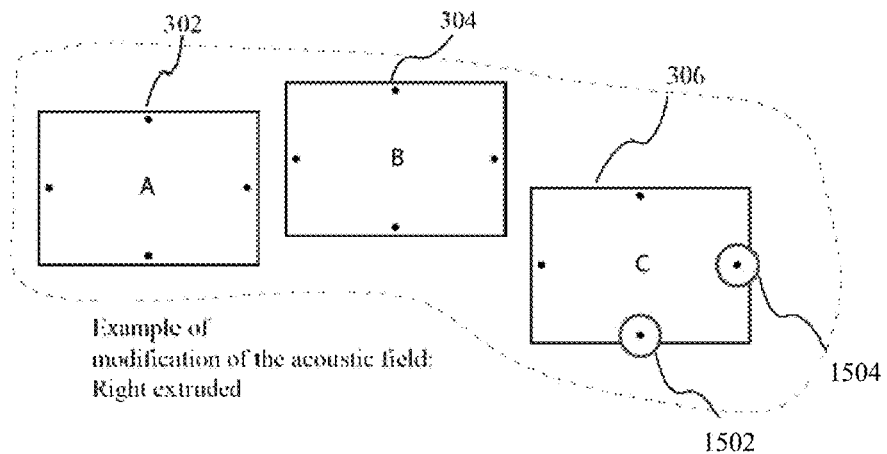

FIG. 15A, shows a normalized acoustic field for the cluster of devices 302-306, where the acoustic field is uniform and covering the whole cluster, but without taking considerations of the surrounding environment or the intended application. For example, in FIG. 15B, when the application is focused on close gestures interaction with the cluster of devices, it is desirable to have a narrower area of interaction. In this particular example, through the control device, it is communicated to the devices in the cluster to narrow down the interaction space on the edges of the cluster. Similar to the process described in FIGS. 14A and 14B, the control device detects and selects the acoustic components that need to be modified, in this case, are components 1502 and 1504 of device 306 to create an acoustic field that is right limited (i.e. having a reduced acoustic field on the right side of the plurality of devices as shown). The control device communicates with device 306 causing device 306 to lower the gain and sensitivity for components 1502 and 1504. Another example is shown in FIG. 15C, where the application is to enable music listening from a cluster of devices to create an acoustic field that is right extruded (i.e. having an extruded acoustic field on the right side of the plurality of devices as shown). In a household example, the cluster might not be placed in the center, but probably shifted towards one specific side. In a music listening experience, it might not be desirable to produce sound in a centralized form, i.e. the center of the cluster is where the sound is focused, but towards the right of such a cluster. In such a case, an embodiment of the present invention allows the user to select to extend the sound output from the cluster to focus on the right of the device, using a control device, by increasing the gain and sensitivity of the audio circuits 1502 and 1504 of device 306.

Figure 16:
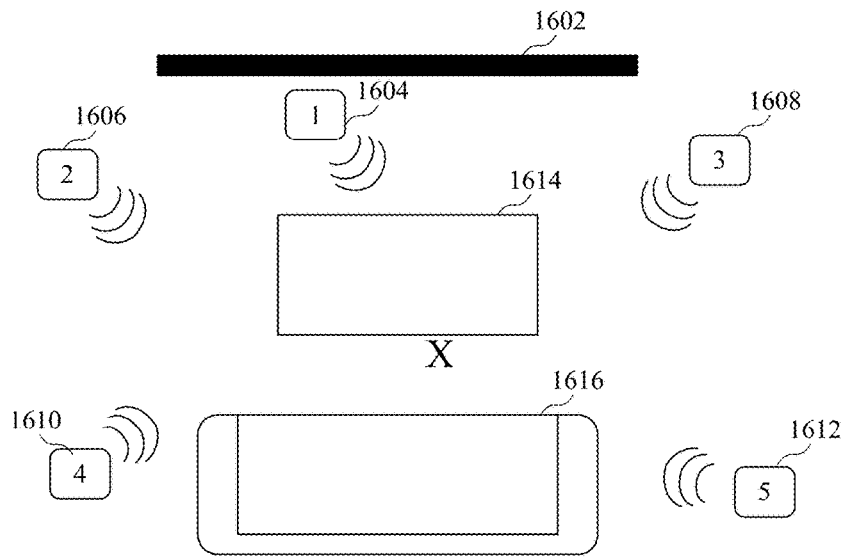
FIG. 16 is an exemplary diagram showing the coordination of devices in a room.

Turning now to FIG. 16, an exemplary block diagram shows the coordination of devices in a room, depicting a surround sound system. Typically, systems like these ship with a set of satellite speakers that work together to provide a unified surround sound experience. These systems are designed with a particular symmetric spatial arrangement in mind and the configuration of various parameters on these speakers such as levels are set according to that assumed arrangement. Unfortunately, living spaces of consumers may vary significantly, making them hard to predict. Users may typically place satellite speakers wherever they can, resulting in asymmetric spatial arrangements and a suboptimal audio experience. According to the example of FIG. 16, a display device 1602, such as a television (TV), can be implemented with a plurality of audio devices (shown here as audio devices 1604-1612 distributed in the room), where a viewer of the display device 1602 (shown here by an X) is between a table 1614 and a couch 1616. Using the above calibration process, and the spatial map, the system can understand this asymmetry in spatial arrangement of speakers and recalculate the levels that would correct for this arrangement and provide a uniform acoustic experience. Furthermore, by analyzing the arrangement of the speakers, it is possible to calculate the "sweet spot", the center point where the sound might be. In another embodiment, based on location of the couch 1616, relative to the TV 1602 and audio devices 1604-1612, adjustment can be performed at TV 1602 and audio devices 1604-1612 so that the couch becomes the sweet spot.

Figure 17:
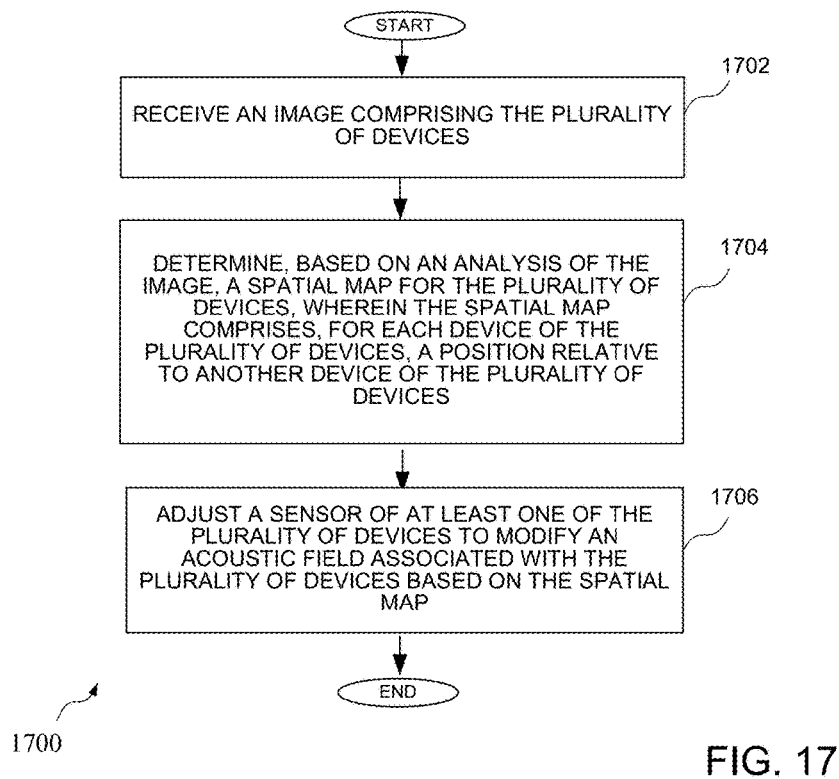
FIG. 17 is an exemplary flow diagram showing another method of managing a plurality of devices.

Turning now to FIG. 17, a flow diagram shows another method of controlling a plurality of devices, such as the devices in a group of devices as set forth above. According to the method of managing a plurality of devices of FIG. 17, an image comprising the plurality of devices is received at a block 1702. A spatial map, based on an analysis of the image, is determined for the plurality of devices at a block 1704. The spatial map may comprise, for each device of the plurality of devices, a position relative to another device of the plurality of devices. A sensor of at least one of the plurality of devices for receiving an input may be adjusted to modify an acoustic filed associated with a plurality of devices based on the spatial map at a block 1708.

According to the method shown in FIG. 17, the sensor may comprise at least one of a microphone for detecting an audio input or a camera for detecting a visual input. The visual input may comprise a gesture of a user interacting with the plurality of devices. The method may further comprise determining an active device of the plurality of devices in response to a detected acoustic input, or determining, in response to an input, an active device of the plurality of devices using localization based on the spatial map and a desired acoustic field to adjust the sensor. The spatial map may identify a position of each audio component of each device of the plurality of devices, and an audio component of the at least one device of the plurality of devices may be adjusted based on the spatial map. The adjusting of a sensor of at least one of the plurality of devices may comprise creating a desired acoustic field for the plurality of devices based on requirement of an application. The method may further comprise calibrating the plurality of devices based upon the spatial map, and recalibrating the plurality of devices based upon a position of a user.

The various elements of the methods of FIGS. 16 and 17 may be implemented using the systems and techniques set forth in FIGS. 1-15 as described, or using some other suitable systems or techniques. While specific elements of the method are described, it should be understood that additional elements of the method, or additional details related to the elements, could be implemented according to the disclosure of FIGS. 1-15.

The systems and techniques set forth above allow applications where multiple acoustic devices implementing such as, and not limited to, gesture spotting or voice localization need to work in consonance, and therefore needs a uniform sensing area or a biased/focused area of listening. By using an imaging based solution to identify and localize devices and the relative location of their audio components, a more robust and precise location of devices can be achieved, allowing the calibration process to be more precise and performed more quickly. Using an image based solution for calibration also allows the identification of devices and their features, such as multiplicity of microphones or speakers, type of components, or relative position of these components with respect to the larger cluster. A normalization of features such as detection, volume, sensitivity of the devices is also possible.

It can therefore be appreciated that new systems and methods of managing a plurality of device has been described. It will be appreciated by those skilled in the art that numerous alternatives and equivalents will be seen to exist that incorporate the disclosed invention. As a result, the invention is not to be limited by the foregoing implementations, but only by the following claims.

We claim:

1. A method of managing a plurality of display devices, the method comprising:
   receiving an image comprising the plurality of display devices;
   determining, based on an analysis of the image, a spatial map for the plurality of display devices, wherein the spatial map comprises, for each display device of the plurality of display devices, a position relative to another display device of the plurality of display devices; and
   adjusting a sensor, adapted to receive an input from the user, of at least one of the plurality of display devices to modify an acoustic field associated with the plurality of display devices based on the spatial map and the received input from the user.

2. The method of claim 1, wherein the sensor comprises at least one of a microphone for detecting an acoustic input or a camera for detecting a visual input.

3. The method of claim 2, wherein the visual input comprises a gesture of a user interacting with the plurality of display devices.

4. The method of claim 1, wherein the received input from the user comprises a detected acoustic input, the method further comprising determining an active display device of the plurality of display devices in response to the detected acoustic input.

5. The method of claim 4, further comprising adjusting the sensor via determining the active display device of the plurality of display devices using localization based on the spatial map and a desired acoustic field.

6. The method of claim 1, wherein the spatial map identifies a position of each audio component of each display device of the plurality of display devices, and an audio component of the at least one display device of the plurality of display devices is adjusted based on the spatial map.

7. The method of claim 1, wherein adjusting a sensor of at least one of the plurality of display devices comprises creating a desired acoustic field for the plurality of display devices based on a type of application supported by the plurality of display devices.

8. The method of claim 1, further comprising calibrating the plurality of display devices based upon the spatial map.

9. The method of claim 1, further comprising calibrating the plurality of display devices based upon a position of a user.

10. The method of claim 1, wherein modifying an acoustic field associated with the plurality of display devices comprises adjusting at least one acoustic component associated with a display device of the plurality of display devices to modify a particular region of the acoustic field.

11. The method of claim 1, wherein receiving an image comprising the plurality of display devices comprises receiving a plurality of images taken at different views.

12. The method of claim 1, wherein adjusting a sensor of at least one of the plurality of display devices to modify an acoustic field comprises creating a uniform acoustic field.

13. An electronic device, comprising:
   a memory storing instructions; and
   a processor executing the instructions to:
      receive an image comprising a plurality of devices having sensors;
      determine, based on an analysis of the image, a spatial map for the plurality of devices, wherein the spatial map comprises, for each device of the plurality of devices, a position relative to another device of the plurality of devices; and
      adjust a sensor, adapted to receive an input from the user, of at least one of the plurality of devices to modify an acoustic field associated with the plurality of devices based on the spatial map, the received input from the user, and a type of application supported by the plurality of devices.

14. The electronic device of claim 12, wherein the sensor comprises at least one of a microphone for detecting an acoustic input or a camera for detecting a visual input.

15. The electronic device of claim 12, wherein adjusting a sensor of at least one of the plurality of devices comprises adjusting at least one acoustic component associated with the at least one of the plurality of devices to modify a particular region of the acoustic field.

16. The electronic device of claim 12, wherein receiving an image comprising the plurality of devices comprises receiving a plurality of images taken at different views.

17. A non-transitory computer-readable storage medium having data stored therein representing instructions executable by a processor to perform a method comprising: receiving an image comprising a plurality of display devices; determining, based on an analysis of the image, a spatial map for the plurality of display devices, wherein the spatial map comprises, for each display device of the plurality of display devices, a position relative to another display device of the plurality of display devices; adjusting a sensor, adapted to receive an input from a user, of at least one of the plurality of display devices to modify an acoustic field associated with the plurality of display devices based on the spatial map and the received input from the user.

18. The non-transitory computer-readable storage medium of claim 17, wherein the sensor comprises at least one of a microphone for detecting an acoustic input or a camera for detecting a visual input.

19. The non-transitory computer-readable storage medium of claim 17, wherein adjusting a sensor of at least one of the plurality of display devices comprises creating a desired acoustic field for the plurality of display devices based on a type of application supported by the plurality of display devices.

20. The non-transitory computer-readable storage medium of claim 17, wherein receiving an image comprising the plurality of display devices comprises receiving a plurality of images taken at different views.

\* \* \* \* \*